Dec. 21, 1937.  P. M. HULME  2,102,955
TEMPERATURE MEASURING INSTALLATION
Filed Sept. 5, 1935
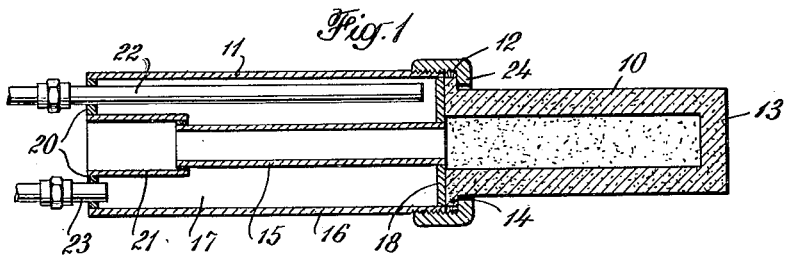
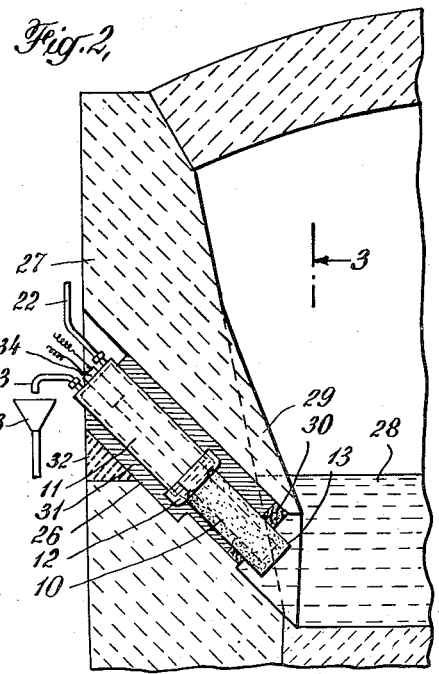
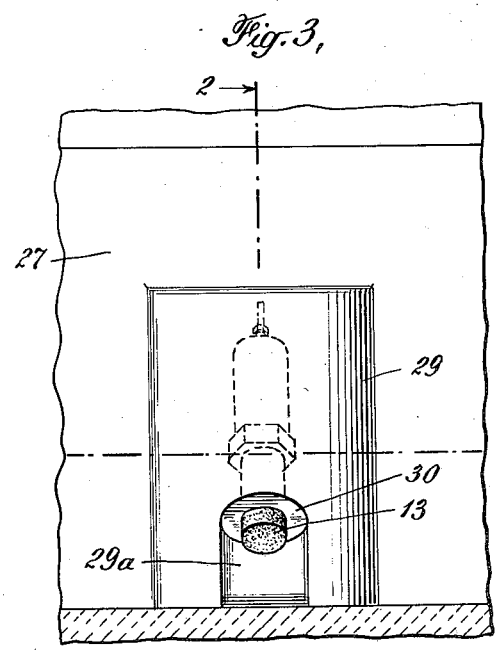
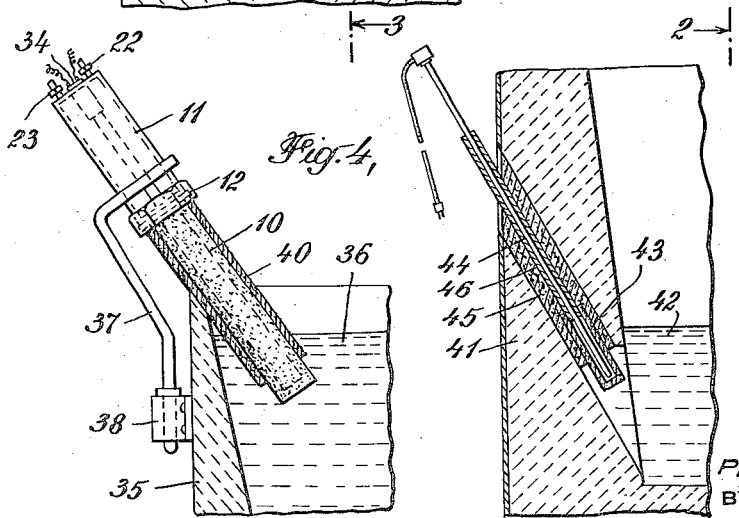
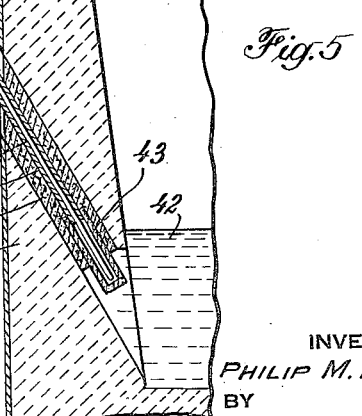
INVENTOR
PHILIP M. HULME
BY
Pennie Davis Marvin and Edmonds
ATTORNEYS Patented Dec. 21, 1937

2,102,955

UNITED STATES PATENT OFFICE 2,102,955

TEMPERATURE MEASURING INSTALLATION

Philip M. Hulme, Chuquicamata, Chile, assignor to Chile Exploration Company, New York, N. Y., a corporation of New Jersey Application September 5, 1935, Serial No. 39,207

7 Claims. (Cl. 73—32)

This invention relates to temperature measurement, and has for an object the provision of an improved arrangement of apparatus for measuring the temperature of a bath of molten metal. The invention further contemplates the provision of an improved manner of arranging apparatus in contact with a bath of molten metal to secure the longest possible life of the apparatus and at the same time to permit the temperatures of the bath to be obtained with a high degree of accuracy.

Three types of commercial temperature-measuring instruments are available for use in measuring the temperature of molten metal. One of these, the optical pyrometer, is not suitable for use if it is desired to measure molten metal temperatures commercially with a high degree of accuracy, or if a high degree of sensitivity is necessary. One of the two remaining types of instruments, the thermocouple or the radiation pyrometer, must be used if these conditions are to be met.

If the thermocouple is to be employed, its "hot" junction must be so arranged in relation to the metal the temperature of which it is desired to measure as to attain the temperature of the metal. As is well known, the thermocouple wires themselves can not be immersed directly in the bath of molten metal. Accordingly, it has been the practice to insert the thermocouple in a protective tube of refractory, non-conducting material, and to immerse the protective tube containing the thermocouple in the molten metal. The radiation pyrometer, on the other hand, need not be brought into such intimate relationship with the metal to secure temperature readings. If accuracy is to be achieved, however, a radiation pyrometer must be sighted upon a body at the same temperature as the molten metal, or upon a portion of the molten metal itself, where substantially ideal black-body conditions prevail, or at least where conditions are such as to represent a substantially constant fraction of ideal black-body conditions. This may most easily be accomplished by immersing a cylindrical tube, closed at the end immersed, in the molten metal, and sighting the radiation pyrometer into the tube (hereinafter referred to as a "target tube").

It is thus apparent that the problem involved in taking the temperature of a bath of molten metal is substantially the same whether a radiation pyrometer or a thermocouple is employed, regardless of the difference in construction or calibration of the different instruments. In either case, best results are achieved if a tube of refractory material is immersed in the molten metal, and the temperature is taken from within the tube itself, by measuring the temperature of the inner surface of the tube (with a radiation pyrometer) or the temperature prevailing within the immersed tube (by a thermocouple). At equilibrium, either of these temperatures will be substantially identical with the temperature of the molten metal in which the tube is immersed.

In measuring the temperature of molten metal within a furnace, two general methods of immersing the tube in the molten metal have been adopted. The simpler of these methods involves immersing the tube in the molten metal by lowering it into the metal from above, either through a suitable port in the roof of the furnace, or at an angle through a door or other aperture in a wall of the furnace. If this practice is adopted, the tube is very quickly corroded by the action of the metal and the furnace gases at the surface of the metal in the furnace, as is described in my copending application, Serial No. 619,869, filed June 29, 1932. As a result, unless some procedure is adopted to protect the tube at the metal surface, the useful life of the tube will be very short indeed. In some cases it will amount to only a few hours. The tubes are generally constructed of a relatively expensive refractory, and unless their life is reasonably prolonged, the cost of new tubes for replacements may prohibit their use.

The second general method heretofore employed for immersing the tube below the surface of molten metal within a furnace involves inserting the tube through a substantially horizontal passage in a wall of the furnace, the passage being at all points below the plane of the surface of the metal, and luting the tube in place within the passage. If this method is adopted, the useful life of the tube may be considerably prolonged, thereby greatly reducing the cost of tube replacements, because the tube does not come in contact with the metal at the surface thereof and thus is not within the influence of the extremely corrosive conditions there existing. This method, however, is attended by very serious disadvantages. In the first place, if anything should happen to the tube to cause it to break, molten metal will flow through the passage, ruining any pyrometer therein and effectively precluding taking any further temperatures until the furnace has been emptied and the damage repaired by cleaning out the passage and inserting a new tube. In the second place, it is impossible to replace a tube in the furnace while the furnace still contains molten metal. Consequently, if the tube should crack or otherwise become unsuited to continued use while the furnace contains a substantial quantity of molten metal, it is necessary to await completion of the furnace campaign, without benefit of temperature measurements, before a new tube may be inserted to replace the damaged one.

In accordance with the present invention, an improved arrangement of the tube within the furnace is provided to overcome the disadvantages of arrangements heretofore generally employed, and to secure advantages not heretofore achieved. The invention has been developed in conjunction with the refining of molten copper, a substance presenting great practical difficulties in attempts to measure its temperature. Particular reference is therefore made below to molten copper, but it is to be understood that the invention is equally applicable to the measurement of temperatures of other substances.

Briefly, the invention comprises providing a downwardly extending passage in a wall of the furnace containing the molten metal, said passage opening into the interior of the furnace below the surface of the molten metal and opening to the exterior of the furnace at a point above the plane of the surface of the molten metal. The tube, which preferably is constructed of silicon carbide, as described below, is inserted into the passage to project into the bath of molten metal below the surface thereof, and is luted in place with a suitable refractory cement.

The inner surface of the furnace wall is preferably provided with an inwardly extending protrusion or bulge tapering smoothly into the walls of the furnace and having a recess therein at the point where the passage opens into the furnace, the recess in effect forming a continuation of the passage. The inwardly extending protrusion serves to project the tube inserted in the passage and which would project beyond the opening of the passage were it not for the protrusion. In this manner the end of the tube is protected form injury by floating cathodes or other solid bodies which might strike it and cause it to crack or break.

The success of the installation, both from the standpoint of economy and from the standpoint of efficiency, is dependent upon proper design and construction of the tube. Over a prolonged period of research, during which a great number of refractory substances including graphite, special metal alloys, and the like were investigated, it was found that silicon carbide yielded the most satisfactory results. Of the several varieties (depending upon the binder employed) of silicon carbide obtainable upon the market, best results were given by a product known by the trade name of "Carbofrax 'C'" but other varieties of silicon carbide may also be employed if desired.

It would involve considerable expense to construct the entire tube of silicon carbide, and no advantage would be attained thereby. Accordingly, it is preferred to construct the tube in two sections, one of which is silicon carbide and the other of which is of less fragile material. The silicon carbide refractory tube, which is immersed in the molten metal, is closed at one end and is provided with a peripheral flange adjacent the other end. The other section of the tube, designated hereinafter as the "pyrometer tube" because it is intended to receive the major portion of the pyrometer, is advantageously constructed of metal and is water-jacketed to prevent it from being damaged by excessively high temperature and to protect the upper portion of the pyrometer which it contains. The pyrometer tube is exteriorly threaded adjacent one end. A union member adapted to engage the flange of the silicon carbide tube and the threads of the pyrometer tube serves to unite the tubes in end-to-end relationship, thereby to provide an unobstructed opening to the closed end of the silicon carbide tube for inserting a thermocouple or for the passage of radiations from the closed end of the silicon carbide target tube to a radiation pyrometer.

Tubes constructed in accordance with the invention may be employed for measuring the temperature of an open bath of molten metal, such as metal contained within a casting ladle, where it is impractical to insert the tube through a wall of the ladle or other container. In this event, it is advantageous to apply to the major portion of the cylindrical surface of the silicon carbide tube a protective layer of refractory, preferably a refractory similar to that employed in lining the ladle, to prevent excessive corrosion of the silicon carbide tube at the surface of the molten metal. The entire exposed portion of the silicon carbide tube should extend below the surface of the molten metal. The water-jacketed portion of the tube may be provided with a bracket for supporting the tube in the bath of molten metal.

The invention will be better understood from a consideration of the following description in conjunction with the accompanying drawing, in which Fig. 1 is a longitudinal cross-section through an assembled tube of preferred design;

Fig. 2 is a vertical cross-section through a furnace of the type employed in refining copper having the tube of Fig. 1 arranged therein in accordance with the invention, taken substantially along the line 2—2 of Fig. 3;

Fig. 3 is an elevation of the furnace wall shown in Fig. 2, taken substantially along the line 3—3 of Fig. 2;

Fig. 4 is a view, partly in section, of a tube constructed as shown in Fig. 1 mounted on a casting ladle; and Fig. 5 is a vertical cross-section through a furnace wall in which is arranged in accordance with the invention a modified tube designed especially to receive a thermocouple.

The tube shown in Fig. 1 comprises a silicon carbide tube 10 and a water-jacketed pyrometer tube 11 united in end to end relationship by means of a union member 12. The silicon carbide tube 10, which preferably is molded of that variety of silicon carbide known to the art under the trade name "Carbofrax 'C'", is closed at one end 13 and is provided adjacent the other end with an outwardly extending peripheral flange 14.

The pyrometer tube 11 comprises an inner tube 15 adapted to receive a pyrometer and an outer tube 16 which defines an outer boundary of an annular water jacket 17. A lower end plate 18 and an upper end plate 20 serve to maintain the inner tube 15 and the outer tube 16 in their proper relative positions and to close the ends of the annular water jacket 17. Advantageously, the inner tube 15 may be enlarged adjacent one end by substituting a section of relatively large tube 21 for a corresponding section of the relatively small inner tube 15, and uniting the relatively large tube 21 with the relatively small inner tube 15 by welding, by means of a threaded ring member, or in any other suitable manner. The relatively large tube 21 will receive the enlarged end portions of certain commercial types of radiation pyrometers or thermocouples.

A water inlet pipe 22 passes through a suitable aperture in the upper end plate 20 and extends through the annular water jacket 17 almost to the lower end plate 18. A water outlet pipe 23 extends through a suitable aperture in the upper plate 20 and terminates immediately within the annular water jacket 17. This arrangement of water inlet and outlet pipes permits maintaining an adequate body of water in the water jacket when the assembly is in its normal operating position (which is at a substantial angle to the horizontal) and insures efficient circulation of water through the water jacket.

The outer surface of the outer tube 16 of the pyrometer tube 11 is threaded adjacent one end thereof. The union member 12 is provided with an inwardly extending flange 24 corresponding to the peripheral flange 14 with which the silicon carbide tube is provided. In the assembled apparatus, the flange 12 of the union member engages the flange 14 of the silicon carbide tube, and interior threads with which the union member is provided engage the threads of the pyrometer tube 11. Thus the silicon carbide tube 10 and the pyrometer tube 11 are united in end-to-end relationship, providing a substantially unobstructed path from the closed end 13 of the silicon carbide tube to the outer end of the pyrometer tube.

A preferred arrangement of the apparatus described above in a furnace is shown in Figs. 2 and 3. A downwardly extending passage 26 is provided in a wall 27 of the furnace. The passage 26 opens into the interior of the furnace below the normal level of the bath of molten metal 28, and opens to the exterior of the furnace at a point above the normal level of the bath.

An inwardly extending bulge or protrusion 29 is provided upon the inner surface of the furnace wall 27 in the vicinity of the opening of the passage 26 into the furnace. A recess 29a in the protrusion 29 provides for communication between the passage and the interior of the furnace, forming in effect a continuation of the passage 26. The protrusion 29 tapers smoothly into the walls of the furnace and serves to protect the projecting end portion of the silicon carbide tubes from floating cathodes or other solid material which might otherwise strike it and cause it to break.

The assembled tube of Fig. 1, comprising the silicon carbide tube 10, the water-jacketed pyrometer tube 11, and the union member 12 is inserted into the passage in such a manner that the closed end 13 of the silicon carbide tube extends into contact with the bath of molten metal 28. The tube is luted in place within the passage by packing suitable refractory cement in the space between the tube and the walls of the passage. The cement should surround substantially the whole of the pyrometer tube 11 in the passage, the union member 12, and the upper portion of the cylindrical surface of the silicon carbide tube 10, and should extend into the passage to a point below that to which the molten metal would rise were the passage not obstructed. In this manner complete immersion of the exposed portion of the silicon carbide tube is assured, thereby preventing the rapid corrosion which occurred at the interface of molten metal and hot furnace gases.

The particular refractory cement employed will vary somewhat with the prevailing temperature, the characteristics of the molten metal, the composition of the furnace walls, and the like. In the case of molten copper in a furnace having a basic lining, best results have been achieved by the use of a compound cement packing. A plug 30 of magnesite clay mixed with water glass (commercial sodium silicate) is first packed about the silicon carbide tube to define the lower limit of the cement packing below the surface of the molten copper and to provide the refractory with which the molten copper actually comes in contact. The balance of the space between the tube and the walls of the passage is filled with cement 31 comprising a mixture of silica sand and fire clay to provide the necessary mechanical strength for resisting the pressure of the molten copper and retaining the tube in its proper position. The upper inner surface of the recess 29a is preferably so disposed that the formation of a gas pocket adjacent the lower end portion of the tube is avoided when the surface of the metal is above the recess.

Advantageously, the lower surface of the passage 26 adjacent the point at which it opens to the exterior of the furnace is defined by a firebrick 32 loosely positioned in the wall of the furnace. When it becomes necessary to replace the tube, the loosely positioned firebrick 32 may be easily withdrawn from its place to facilitate extraction of the tube.

The water inlet tube 22 which supplies cooling water to the water jacket of the pyrometer tube 11 is suitably connected to a convenient source of water (not shown) and the water outlet tube 23 empties into any suitable discharge conduit 33. A pyrometer 34 is positioned within the tube for securing temperature readings.

Removal of the tube may readily be accomplished whether the furnace contains its charge of molten copper (or other metal) or not. The pyrometer 34 is withdrawn from the tube, the loosely positioned firebrick 32 is removed, the water inlet 22 is disconnected from its source of water, and the entire assembly is thereupon pulled bodily from its setting within the passage, suitably designed tongs or equivalent apparatus being employed. The extracted tube is repaired and replaced, or a tube already prepared is inserted into the passage and luted in position as before.

Fig. 4 shows an adaptation of the tube described in conjunction with Fig. 1 mounted for recording the temperature of an open bath of molten metal, such as molten copper in a casting ladle 35. The tube, comprising a silicon carbide tube 10, a water-jacketed pyrometer tube 11, and a union member 12, is provided with a bracket 37 for mounting in position in contact with the molten metal 36. The bracket is associated with the pyrometer tube 11 and is received by a bracket support 38 mounted upon the side of the ladle 35.

The major portion of the cylindrical surface of the silicon carbide tube 10 has applied thereto a protective coating 40 designed to prevent excessive corrosion of the tube at the interface of the molten metal 36 and the atmosphere above it. The protective coating 40 advantageously comprises a layer of cement composition approximating the composition of the ladle lining. In the case of a ladle lined with silica, a silica sand-cement mixture is a suitable composition, although other compositions known to the art may be employed if desired. In any event, the protective coating should encase the walls of the silicon carbide tube to a point substantially below the surface of the molten metal, leaving only the closed end portion of the silicon carbide tube exposed, and this entirely below the surface of the metal.

The inlet water pipe 22 is connected to a suitable source of water (not shown) and the water outlet pipe is allowed to discharge into a suitable conduit (not shown). A pyrometer 34 is positioned within the tube for obtaining temperature measurements.

In Fig. 5 a modified form of tube adapted for use in conjunction with a thermocouple is shown arranged in a furnace wall 41 for securing the temperature of a bath of molten metal 42. The tube comprises a silicon carbide tube 43 closed at the lower end and a metallic pyrometer tube 44 associated therewith. The pyrometer tube 44 is not provided with a water jacket, nor is the silicon carbide tube 43 provided with a flange. The two tubes are united by inserting the pyrometer tube 44 into a recess in the open end of the silicon carbide tube 43 and cementing or otherwise suitably fastening it therein.

The mounting of the tube in the furnace is substantially identical with that described above in conjunction with Figs. 2 and 5. A passage 45 extends downward through the wall of the furnace, opening into the interior thereof below the surface of the molten metal and opening to the exterior of the furnace above the plane of the surface of the metal. No bulge or protrusion is shown provided on the inner surface of the wall 41 because the silicon carbide tube 43 does not extend beyond the opening of the passage 45 into the furnace, and so does not require the protection which would be afforded by a protrusion. The tube is luted in place in the passage with a cement packing 46, substantially as described above in conjunction with Figs. 2 and 3.

The operation of all of the tubes described is substantially the same and will be apparent from the above description. The molten metal raises the temperature of the exposed portion of the silicon carbide tube to substantially its own temperature, and the temperature of the tube is measured by the pyrometer which it contains. The protrusion, if provided, prevents solid material in the furnace charge from striking the end of the silicon carbide tube and breaking it, as might occur if the tube projected beyond the protecting walls of the passage. The pyrometer may be connected to an indicator or to a recording instrument located in any suitable position.

By employing silicon carbide as the refractory of the tube, a substantially longer useful life of the tube may be attained than by any other commercially obtainable refractory. By constructing the tube in two sections, making the upper one of metal and providing it with a water jacket, the cost of the tube may be reduced to a minimum. At the same time, a pyrometer contained within the water-jacketed tube is afforded substantial protection which it would not have if inserted directly in a tube not provided with a water jacket. Parenthetically it may be noted that a water jacket is best adapted to use in conjunction with a radiation pyrometer. If used in connection with a thermocouple, it may in some instances cool the upper portion of the metal sheath of a commercial thermocouple to such an extent that heat is conducted away from the area of the hot junction in the lower portion of the tube, thereby reducing the temperature at the hot junction and leading to temperature measurements lower than the true temperature of the metal.

The arrangement of the tube in the furnace is such as to prevent the outflow of metal should the tube be broken or withdrawn from the passage while the furnace contains a charge of molten metal. This feature provides greater protection of the pyrometer than is provided when the passage through which the pyrometer extends is wholly below the surface of the molten metal. This is especially the case if a radiation pyrometer is employed for in such case the pyrometer need not be inserted into the tube to a point below the plane of the surface of the metal.

It must be remembered that the silicon carbide tube is fragile and will be broken if subjected to undue strain, either of a mechanical or of a thermal nature. Breakage from mechanical causes may be avoided by protecting the tube from solid materials which might strike it, and by mounting the tube in the furnace or in the ladle at a point where the wash of the molten metal is not excessive, as it is at the discharge spout of either furnace or ladle. To guard against breakage from thermal strain, the silicon carbide tube must be brought to the temperature of the molten metal slowly, and must be cooled slowly when withdrawn from the furnace. In no case should it be plunged while cold into molten metal, nor should it be allowed to cool in an atmosphere at room temperature when withdrawn from the molten metal. Otherwise excessive breakage is sure to occur. It is best, when practical, to allow the tube to remain in the molten metal at all times and to increase and decrease in temperature with the metal. If these precautions are followed, the silicon carbide tube will have a useful life of ten days or more and, when used in accordance with the invention, will give better service than any tube heretofore proposed or employed for a similar purpose.

I claim:

1. A temperature measuring installation associated with a furnace for measuring the temperature of a bath of molten metal within the furnace comprisng a furnace wall having a passage extending downwardly therethrough opening into the furnace at a point below the surface of molten metal therein and opening to the exterior of the furnace above the plane of the surface of the molten metal, temperature measuring apparatus comprising a silicon carbide tube closed at its lower end mounted within the passage in such a manner that the closed end of the silicon carbide tube extends into the molten metal below the surface thereof, and cement packed between the walls of the passage and the temperature measuring apparatus above the closed end of the silicon carbide tube to hold the temperature measuring apparatus in place.

2. A temperature measuring installation associated with a furnace for measuring the temperature of a bath of molten metal within the furnace comprising a furnace wall having a passage extending downwardly therethrough opening into the furnace at a point below the surface of molten metal therein and opening to the exterior of the furnace above the plane of the surface of the molten metal, temperature measuring apparatus comprising a silicon carbide tube closed at its lower end mounted within the passage in such a manner that the closed end of the silicon carbide tube extends into the molten metal below the surface thereof, an inwardly extending protrusion associated with the inner wall of the furnace in the vicinity of the opening of the passage into the interior of the furnace for protecting the silicon carbide tube from breakage, and cement packed between the walls of the passage and the temperature measuring apparatus above the closed end of the silicon carbide tube to hold the temperature measuring apparatus in place.

3. A temperature measuring installation associated with a furnace for measuring the temperature of a bath of molten copper within the furnace comprising a furnace wall having a passage extending downwardly therethrough opening into the furnace at a point below the surface of molten copper therein and opening to the exterior of the furnace above the plane of the surface of the molten copper, temperature measuring apparatus comprising a silicon carbide tube closed at its lower end mounted within the passage in such a manner that the closed end of the silicon carbide tube extends into the molten copper below the surface thereof, and cement resistant to attack by molten copper packed between the walls of the passage and the temperature measuring apparatus above the closed end of the silicon carbide tube to hold the temperature measuring apparatus in place.

4. A temperature measuring installation associated with a furnace for measuring the temperature of a bath of molten copper within the furnace comprising a furnace wall having a passage extending downwardly therethrough opening into the furnace at a point below the surface of molten copper therein and opening to the exterior of the furnace above the plane of the surface of the molten copper, temperature measuring apparatus comprising a silicon carbide tube closed at its lower end mounted within the passage in such a manner that the closed end of the silicon carbide tube extends into the molten copper below the surface thereof, magnesite clay packed between the walls of the passage and the upper portion of the silicon carbide tube, and silica cement packed between the walls of the passage and the temperature measuring device above the magnesite clay to hold the temperature measuring apparatus in place.

5. A temperature measuring installation associated with a furnace for measuring the temperature of molten metal within the furnace comprising a furnace wall having a passage extending downwardly therethrough opening into the furnace below the surface of molten metal therein and opening to the exterior of the furnace above the plane of the surface of the molten metal, a thermocouple protective tube comprising a silicon carbide tube closed at its lower end and a metallic protective tube associated therewith adjacent its open upper end, and cement resistant to attack by the molten metal packed between the walls of the passage and the thermocouple protective tube in such a manner that only the lower end portion of the silicon carbide tube is exposed to the molten metal to hold the thermocouple protective tube in place.

6. A temperature measuring installation associated with a furnace for measuring the temperature of a bath of molten metal within the furnace comprising a furnace wall having a passage extending downwardly therethrough opening into the furnace at a point below the surface of molten metal therein and opening to the exterior of the furnace above the plane of the molten metal, and temperature measuring apparatus mounted within the passage in such manner that adjacent the interior of the furnace the temperature measuring apparatus extends into contact with the molten metal only below the surface thereof and adjacent the exterior of the furnace is positioned above the plane of the surface of the molten metal.

7. A temperature measuring installation associated with a furnace for measuring the temperature of a bath of molten metal within the furnace comprising a furnace wall having a passage extending downwardly therethrough opening into furnace at a point below the surface of molten metal therein and opening to the exterior of the furnace above the plane of the molten metal, temperature measuring apparatus mounted within the passage in such manner that adjacent the interior of the furnace the temperature measuring apparatus extends into contact with the molten metal only below the surface thereof and adjacent the exterior of the furnace is positioned above the plane of the surface of the molten metal, and cement resistant to attack by the molten metal packed between the walls of the passage and the temperature measuring apparatus to hold the temperature measuring apparatus in place.

PHILIP M. HULME.